(12) United States Patent
Weiss (10) Patent No.: US 11,181,217 B2
(45) Date of Patent: Nov. 23, 2021

(54) CONNECTING DEVICE FOR A FLUID LINE AND CORRESPONDING MOUNTING METHOD

(71) Applicant: Festo SE & Co. KG, Esslingen (DE)

(72) Inventor: Martin Weiss, Goppingen (DE)

(73) Assignee: FESTO SE & CO. KG, Esslingen (DE)

( * ) Notice: Subject to any disclaimer, the term of this patent is extended or adjusted under 35 U.S.C. 154(b) by 464 days.

(21) Appl. No.: 16/088,872

(22) PCT Filed: Feb. 16, 2017

(86) PCT No.: PCT/EP2017/053529
§ 371 (c)(1),
(2) Date: Sep. 27, 2018

(87) PCT Pub. No.: WO2017/174246
PCT Pub. Date: Oct. 12, 2017

(65) Prior Publication Data
US 2020/0326023 A1    Oct. 15, 2020

(30) Foreign Application Priority Data
Apr. 5, 2016    (DE) .......................... 102016205621.2

(51) Int. Cl.
*F16L 37/00*    (2006.01)
*F16L 37/091*    (2006.01)

(52) U.S. Cl.
CPC ................................ *F16L 37/0915* (2016.05)

(58) Field of Classification Search
CPC ....... F16L 37/0915; F16L 17/08; F16L 19/04; F16L 19/08; F16L 21/08; F16L 37/091;
(Continued)

(56) References Cited

U.S. PATENT DOCUMENTS 5,553,895 A  *  9/1996  Karl .............................. 285/321
5,603,530 A  *  2/1997  Guest .................... F16L 37/091
285/110

(Continued)

FOREIGN PATENT DOCUMENTS

CN    1393651 A    1/2003
CN    201836571 U    5/2011
(Continued)

OTHER PUBLICATIONS

Chinese Search Report dated Sep. 30, 2020.

*Primary Examiner* — Matthew Troutman
*Assistant Examiner* — William S. Choi
(74) *Attorney, Agent, or Firm* — Hoffmann & Baron, LLP (57) ABSTRACT

A connecting device for a fluid line, which has a connecting unit which, by using a threaded section having an external thread of a fixing element consisting of resilient material, can be fixed in a fixing opening provided with an internal thread of a carrier component. The threaded section is followed axially by a top section correspondingly having a greater diameter, in which an annular retaining element is fixed. The connecting unit is penetrated by an insertion opening, into which the fluid line to be connected can be inserted, such that the fluid line projects through the annular retaining element and is fixed by retaining claws of the retaining element.

22 Claims, 5 Drawing Sheets

(58) Field of Classification Search
CPC .............. F16L 37/0982; F16L 37/0927; F16L 37/0987; F16L 47/16
USPC ....... 285/331, 108, 110, 113, 308, 313, 321, 285/345, 353, 354, 355, 357, 379, 386
See application file for complete search history.

(56) References Cited

U.S. PATENT DOCUMENTS 6,908,120 B2 * 6/2005 Tomita ................ F16L 37/0915
 285/308
8,262,094 B2 * 9/2012 Beele

FOREIGN PATENT DOCUMENTS

| CN | 203431372 U | 2/2014 |
|---|---|---|
| DE | 8908670 | 9/1989 |
| DE | 3923579 | 1/1990 |
| DE | 19800050 A1 | 7/1998 |
| DE | 102012021683 | 5/2014 |
| EP | 0185802 | 7/1986 |
| EP | 0957305 | 11/1999 |
| EP | 1754921 A2 | 2/2007 |
| FR | 2757442 | 6/1998 |
| GB | 1550624 | 8/1979 |

\* cited by examiner

CONNECTING DEVICE FOR A FLUID LINE AND CORRESPONDING MOUNTING METHOD

This application is the National Stage of International Application No. PCT/EP2017/053529, filed Feb. 16, 2017, which claims priority to DE102016205621.2, filed Apr. 5, 2016.

BACKGROUND OF THE INVENTION

The invention relates to a connecting device for a fluid line, having a connecting unit which is axially penetrated by an insertion opening into which a fluid line to be connected is insertable from a rear side, the connecting unit having an integral fastening body made in one single piece which has a thread section provided with an external thread and a head section adjoining thereto on the rear side and which carries an annular retaining element arranged coaxially to the insertion opening which has a plurality of retaining claws protruding into the insertion opening which are designed to impinge upon the outer circumference of the fluid line inserted into the insertion opening for the purposes of holding it, the connecting unit being insertable with its thread section into a fastening opening of a separate carrier component having an internal thread and being fixable on the carrier component by engagement into the internal thread of this fastening opening to adopt a position of use. The invention also relates to a method for mounting such a connecting device.

A connecting device of this type known from EP 0 185 802 A1 has a connecting unit which contains a fastening body designed in the manner of a screw by means of which it is screwable into a fastening opening of a separate carrier component equipped with an internal thread. The connecting unit is axially penetrated by an insertion opening into which a fluid line to be connected is insertable from the rear side located outside of the carrier component. A retaining element coaxial to the insertion opening is fixed on the fastening body which has a plurality of retaining claws protruding obliquely and radially inwardly which protrude at the front side of the base body before the insertion opening. When the fluid line is inserted, the retaining claws are pressed outwardly such that they abut on the outer circumference of the fluid line under pretension and secure the same against removal from the connecting unit. The retaining element is placed on a thread section of the fastening body from the front side which has an external thread adjusted to the internal thread of the carrier component. Upon mounting, the connecting unit with the fastening body is screwed into the fastening opening of the carrier component until a head section of the fastening body axially adjoining the thread section abuts on the outer surface of the carrier component and is pretensioned with said carrier component.

A connecting device is known from DE 10 2012 021 683 A1 which has a retaining collar which is composed of an enveloping body consisting of an elastomer material and a retaining element embedded in the enveloping body and having oblique retaining claws. In its position of use, the retaining collar is snapped into a fastening opening of a carrier component, it being fixed as a result such that an annular projection formed in the carrier component engages into an annular groove formed on the outer circumference of the enveloping body.

A connecting device is known from GB 1 550 624 which has a sleeve body in which an annular groove is formed in which a combination part consisting of a spring-elastic retaining element and a sealing element is fixed. The retaining element is partially embedded into the sealing element. The sealing element serves both to seal with respect to the sleeve body and with respect to an inserted fluid line.

SUMMARY OF THE INVENTION

The object of the invention is to provide a connecting device for a fluid line which enables secure retaining of the connecting unit in the fastening opening of a carrier component with cost-effective structure. A convenient method for installing such a connecting device should also be provided.

To solve this object, in the case of a connecting device of the type mentioned in the introduction, the integral fastening body including its external thread consists of a material with rubber-elastic properties and the annular retaining element is anchored into the thread section exclusively in the head section of the fastening body without engagement.

The connecting device according to the invention contains a connecting unit composed of only a few parts and thus cost effective to manufacture. The fastening body has a thread section provided with an external thread by means of which it is fixable in an internal thread of a separate carrier component, the rubber-elastic material selection normally also ensuring a secure sealing both in relation to the carrier component and with respect to the inserted fluid line without an additional sealing element. In its position of use, the connecting unit with the external thread of the thread section of its fastening body engages into an internal thread of the carrier component and as a result is anchored in a positive-locking manner in the carrier component. Owing to the elasticity of the material, larger manufacturing tolerances are also compensated without problems such that the requirements for manufacturing precision are relatively low which advantageously impacts the manufacturing costs. The fixing of the retaining element carried out exclusively in the head section allows the connecting device to also be used even with small diameters of fastening openings because the thread section is not bound in its minimal dimensions to the dimensions of the retaining element. The inserted fluid line is securely held by the retaining claws of the retaining element which expediently protrude obliquely and radially inwardly into the insertion opening.

Advantageous further developments of the invention emerge from the dependent claims.

The head section arranged in the mounted position of use of the connecting unit outside of the fastening opening of the carrier component preferably has a larger outer diameter than the thread section and adjoins the thread section via an expediently annular grading. The annular grading expediently defines a preferably annular support surface pointing axially forwards in the direction of the thread section which is designed in the position of use of the connecting unit for support on a counter support surface surrounding the outlet of the fastening opening of the carrier component. At least the end of a mounting operation is expediently expressed in a rotational movement of the fastening body such that its support surface is axially pretensioned with the counter support surface of the carrier component and secure retaining of the fastening body is ensured.

The external thread expediently extends exclusively along the thread section, while the head section does not have any external thread. The head section is expediently formed cylindrically on the outside, can, however, also be constructed in a polygonal shape and/or have at least two flattened portions in order to be able to position an actuation tool suitable for introducing a torque. Normally, however, sufficient fixing is already achieved owing to the rubber elasticity of the fastening body such that the fastening body is tightened by hand.

The external thread of the thread section can be designed such that it extends only over a partial length of the thread section. However, it preferably extends over the entire length of the thread section. The head section preferably adjoins the external thread directly.

The external thread expediently has an uninterrupted, continuous thread turn. However, a structure is also possible in which the external thread is segmented and the thread turn is composed of a plurality of consecutive thread turn sections spaced from one another.

In relation to the axial direction of the insertion opening, the retaining element expediently has shorter dimensions than the head section, it being placed in the head section such that it is axially towered over on both sides by the head section. The retaining element is preferably formed flat in a disc shape.

A particularly cost-effective structure of the retaining element provides for the retaining element to be composed only of an annular body and of retaining claws integrally connected to the annular body by forming one piece. The retaining element is anchored in the fastening body via the annular body, which is why the annular body can be designated as an anchoring annular body.

Overall, the retaining element is expediently formed integrally in one piece. It consists in particular of a spring-elastic metal, in particular stainless steel. It is preferably manufactured by a combined stamping and bending operation such that it is present as a so-called stamped bent part.

The rubber-elastic fastening body is expediently an injection moulded part which is formed on the previously separately manufactured retaining element directly during its manufacture by injection moulding such that the retaining element is embedded at least partially into the material of the fastening body. In this manner, a particularly close connection between the fastening body and the retaining element results.

The rubber-elastic fastening body preferably consists of an elastomer material. It can for example consist of NBR (nitrile butadiene rubber). The implementation of a thermoplastic elastomer material (TPE) has proven to be particularly expedient.

The fastening body consisting of a rubber-elastic material can itself directly form a cost-effectively implementable sealing structure which provides a sealing of the fastening body in relation both to the carrier component and the inserted fluid line. The fastening body expediently defines at least one annular outer sealing section provided to abut on the carrier component in a sealing manner and also at least one annular inner sealing section enclosing the inserted fluid line at its outer circumference in a sealing manner. In this manner, it is not necessary to equip the connecting device with separate sealing elements, in particular sealing rings.

The fastening body expediently has in the region of the thread section at least one annular sealing bead arranged concentrically in relation to the insertion opening and protruding radially inwardly into the insertion opening, said sealing bead is provided for tight attachment to the outer circumferential surface of the inserted fluid line. The inner diameter of the insertion opening in the region of this sealing bead is, in the non-inserted state of a fluid line, smaller than the outer diameter of the fluid line. As a result, the annular sealing bead is elastically deformed when the fluid line is inserted and presses with high sealing force on the outer circumferential surface of the fluid line. At the same time, the sealing bead is, however, also radially expanded such that the external thread of the thread section, at least in the longitudinal section having the sealing bead, is also deformed radially outwardly and is actively pressed into the internal thread of the fastening opening of the carrier component. In this manner, a reliable sealing between the fastening body and the carrier component results. At the same time, a frictional connection between the fastening body and the carrier component is achieved in this manner which counteracts twisting and any release of the fastening body. The fastening body is therefore also then securely fastened in the carrier component with the fluid line inserted if the fastening body has been tightened previously with only light force and for example purely manually.

The elasticity of the fastening body is in particular sufficiently high to also enable an axial insertion of the thread section into the fastening opening provided with an internal thread without a screwing operation. This simplifies the mounting operation and facilitates quick assembly of the connecting unit and the carrier component. The mounting operation is comparable with a repeated latching operation.

If the connecting device provides the possibility of being able to easily remove an inserted fluid line as required at any time and without damage from the connecting unit, the connecting unit can be or is expediently equipped with a release sleeve which is arranged so as to be axially displaceable in the fastening body and protrudes from the fastening body on the rear side with an actuation section which can be manually impinged. The release sleeve is mounted upstream of the retaining claws axially outwardly inside the fastening body such that it can act on the retaining claws by way of a pressure on the actuation section and can lift the same off the outer circumference of the inserted fluid line.

The release sleeve is expediently held inside the fastening body in a securing groove formed as an annular groove-like extension of the insertion opening. Owing to the rubber elasticity of the fastening body, the release sleeve can be very easily snapped into the securing groove.

A fluid channel is preferably formed in the carrier component expediently involved in the connecting device, said fluid channel communicates with the fastening opening. The line channel formed in the fluid line is therefore in fluid connection to the fluid channel of the carrier component when the fluid line is connected.

The carrier component is expediently a housing body of a fluid engineering component, for example a valve or a fluid-actuated drive. The connecting unit can be very easily mounted directly on a fluid engineering component in this manner.

A particularly expedient method for mounting the connecting device provides for the connecting unit being pressed axially into the fastening opening of the carrier component with the thread section of its fastening body under elastic deformation of the external thread without a screwing operation such that the external thread of the thread section is engaged in a positive-locking manner with the internal thread of the fastening opening of the carrier component. Only then is the fastening body twisted further in a subsequent mounting step, from which a screwing operation results which means that the fastening body is axially pretensioned with the carrier component. The axial pretensioning results, in particular from the axial pressing of an axially oriented support surface formed on the head section on a counter support surface of the carrier component coaxial to the fastening opening. The removal of the connecting unit expediently takes place by a pure screwing operation.

If a standardised thread size is used for the external thread of the thread section, any carrier components that have a fastening opening provided with an internal thread can be equipped or even retrofitted with the connecting device.

The carrier component expediently consists at least in the region of the fastening opening of a rigid material, for example of metal or a plastic material.

BRIEF DESCRIPTION OF THE DRAWINGS

The invention will be explained in further detail below using the enclosed drawing. In said drawing is shown.

DETAILED DESCRIPTION OF THE PREFERRED EMBODIMENTS

The advantageous embodiment of a connecting device designated with the reference numeral 1 as a whole illustrated in the drawing contains a connecting unit 4 which engages into a fastening opening 3 of a carrier component 2 in its position of use and is fastened into this fastening opening 3.

Figure 1:
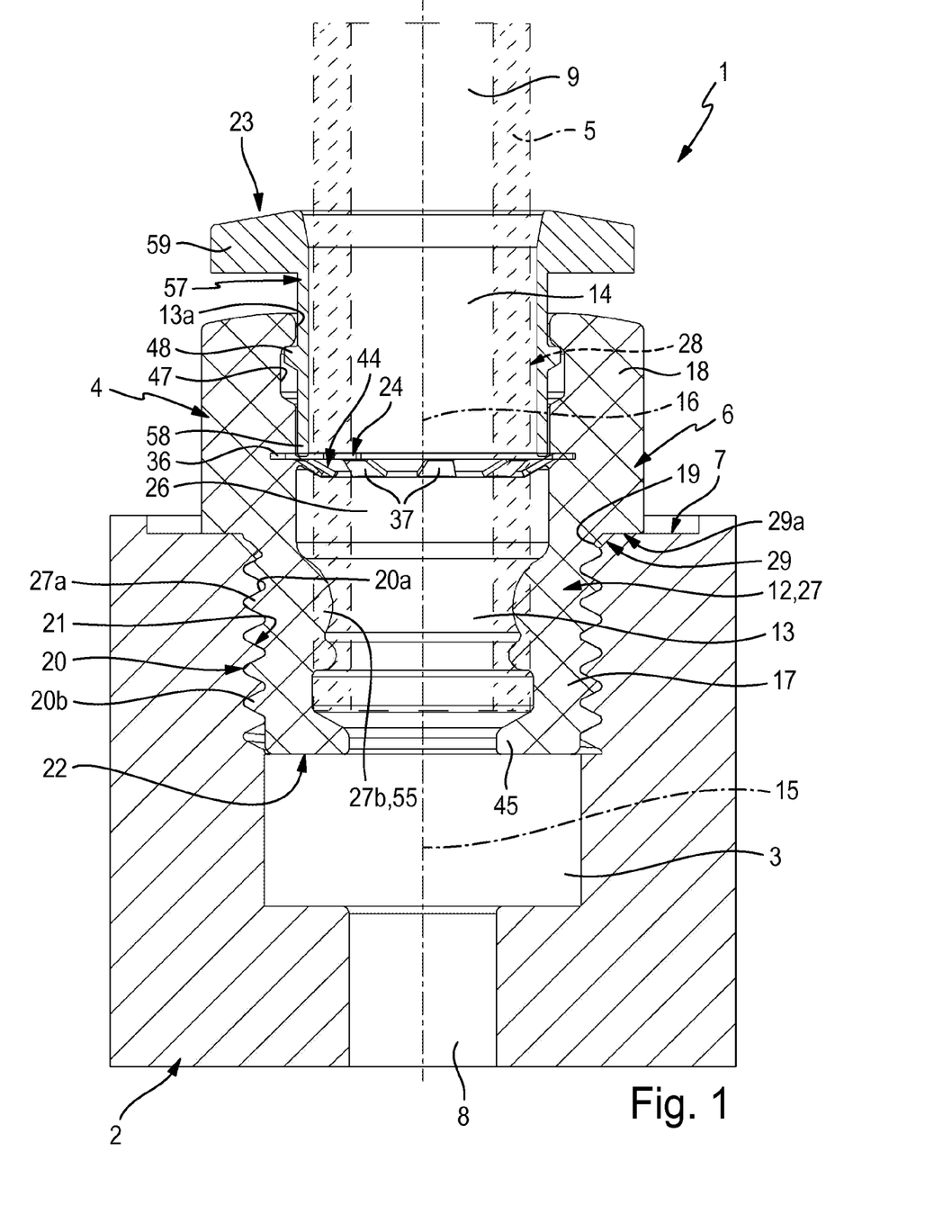
FIG. 1 a longitudinal section through a preferred embodiment of the connecting device according to the invention, the connecting unit being shown in its position of use inserted into a carrier component and a connected fluid line being indicated with a dotted line, FIG. 2 the arrangement from FIG. 1 in a perspective exploded representation, FIG. 3 the exploded representation from FIG. 2 in a longitudinal section, FIG. 4 an individual representation of the connecting unit in a side view, FIG. 5 a longitudinal section of the connecting device, the optional release sleeve and the carrier component being indicated only with a dotted line, FIG. 6 a perspective individual representation of the retaining element being used in the connecting device of FIGS. 1 to 5, FIG. 7 a plan view of the retaining element with a viewing direction according to the arrow VII from FIG. 6 and FIG. 8 a side view of the retaining element with a viewing direction according to the arrow VIII from FIG. 7.
Figure 2:
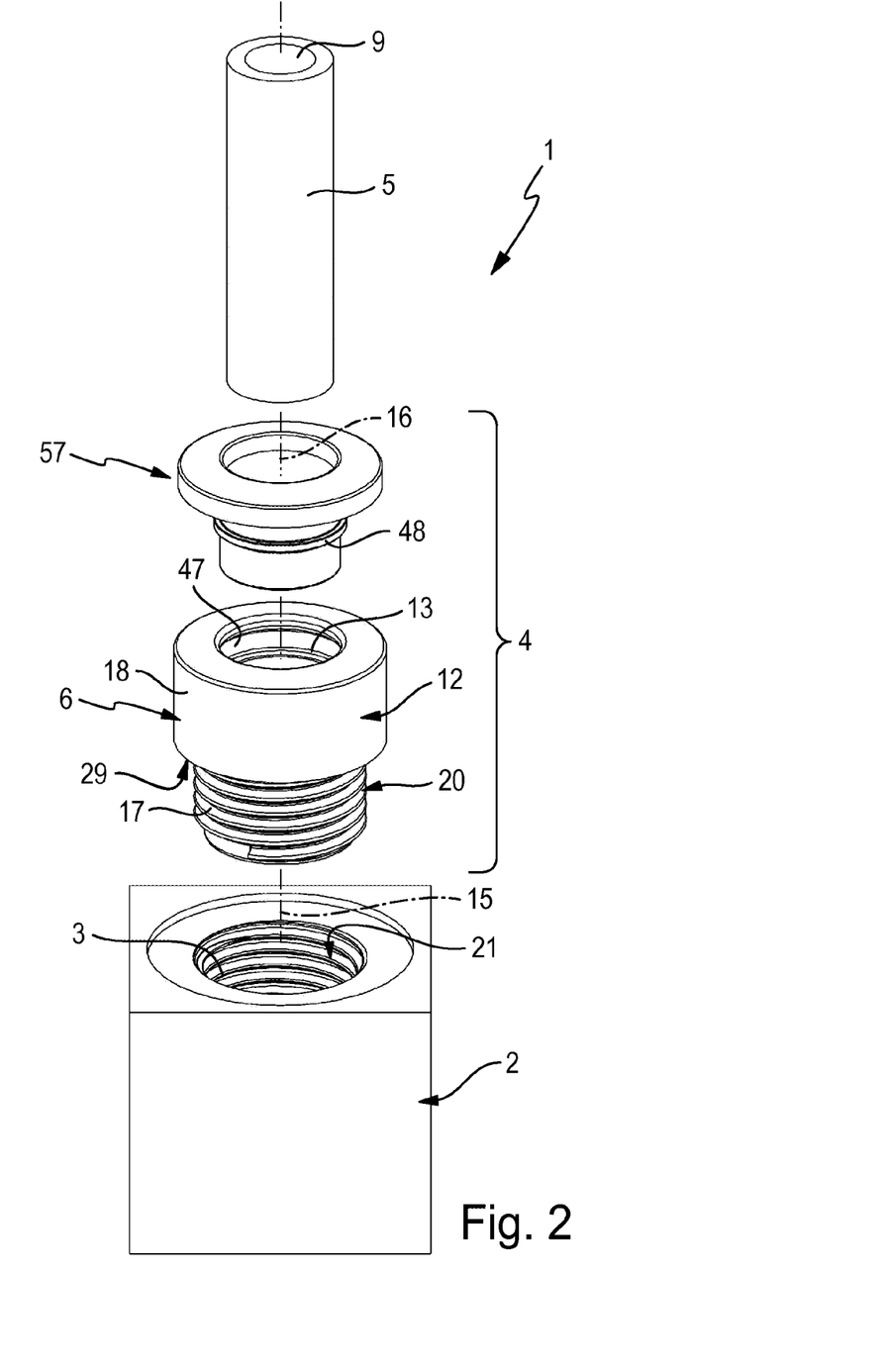

The connecting device 1 is suitable for connecting a fluid line 5 which is designed to channel a fluidic pressurised medium such as pressurised air or pressurised fluid. The connectable fluid line 5 is preferably a flexible hose. Although it can also be a rigid tube. The fluid line 5 is shown in FIG. 1 in the connected state.

In deviation from the exemplary embodiment, the connecting unit 4 can alone form the connecting device 1. The connecting unit 4 can be combined with any carrier component 2 that has a suitably designed fastening opening 3. There is therefore in particular the possibility of equipping or retrofitting carrier components 2 already present with one or a plurality of connecting units 4 as required.

The connecting device 1 is preferably configured as an assembly corresponding to the exemplary embodiment, which is composed of at least one connecting unit 4 and a carrier component 2 having at least one fastening opening 3 adapted to the connecting unit 4. In this case, the connecting unit 4 can be mounted ex works during delivery adopting its position of use on the carrier component 2. Alternatively, connecting unit 4 and carrier component 2 can also be delivered as components separated from one another which are mounted only by the user, i.e. assembled.

In the case of the illustrated exemplary embodiment, the carrier component 2 is formed by a part of a fluid engineering component such as for example a valve, a fluid-operated drive or a pressurised air maintenance device. The carrier component 2 is preferably represented by a housing body of such a fluid engineering component, for example by a cylindrical housing or by a valve housing. In the drawing, the carrier component 2 is reproduced in a very simplified manner.

According to an embodiment of the connecting device 1 not shown, the carrier component 2 has a further fastening interface, in addition to the at least one fastening opening 3, by means of which it is fixable to a fluid engineering component of the aforementioned type. In this case, the carrier component 2 acts as a link between the connecting unit 4 and the fluid engineering component to be equipped therewith.

The fastening opening 3 formed in the carrier component 2 in the manner of a recess opens out with an outlet opening 19 to an outer surface of the carrier component 2 designed below as connection outer surface 7 and has a longitudinal axis 15. In the interior of the carrier component 2, a fluid channel 8 adjoins the fastening opening 3, in particular with a coaxial alignment, with said fluid channel a line channel 9 penetrating the fluid line 5 is in fluid connection when the fluid line 5 is connected.

The connecting unit 4 has a longitudinal axis 16 and has an annular cross-section at right angles to this longitudinal axis 16. It has an axially-oriented front side 22 and a rear side 23 axially opposed in this respect and is coaxially broken through, the breakthrough opening out on the one hand to the front side 22 and on the other hand to the rear side 23 being designated as insertion opening 26. The fluid line 5 to be connected is insertable into the insertion opening 26 from the rear side 23.

The connecting unit 4 is for example composed of two components and of a first component designed in the manner of a collar and therefore designated as retaining collar 6 and of a release sleeve 57 fixed detachably or undetachably on the retaining collar 6 which allows an easy release of a connected fluid line 5. The release sleeve 57 is, however, optional and can also be omitted such that the connecting unit 4 consists exclusively of the retaining collar 6.

The connecting unit 4 and for example its retaining collar 6 contain an integral fastening body 12 which is made in a single piece and an annular retaining element 24 fixed on the fastening body 12. The retaining element 24 is coaxially penetrated by a through opening 13 which forms the insertion opening 26 on its own in the case of an absent release sleeve 57. The optional release sleeve 57 engages into the through opening 13 of the fastening body 12 from the rear side 23 such that the axially continuous sleeve opening 14 surrounded by the release sleeve is coaxially aligned with the through opening 13, in which case the insertion opening 26 for the fluid line 5 is formed together by the sleeve opening 14 and the longitudinal section of the through opening 13 extending between the release sleeve 57 and the front side 22 of the fastening body 12.

The fastening body 12 is divided in its longitudinal direction into a plurality of sections passing integrally into one another to form a single piece, said fastening body having a thread section 17 originating from the front side 22 and a head section 18 adjoining thereto at the rear side. The fastening body 12 preferably consists exclusively of the thread section 17 and the head section 18.

The head section 18 expediently has a larger outer diameter than the thread section 17. In this manner, the head section 18 adjoins the thread section 17 via an annular grading 29 and defines an annular support surface 29a pointing axially forwards in the direction of the front side 22.

The thread section 17 has an external thread 20 on its peripheral outer circumferential surface. The external thread 20 preferably extends over the entire axial length of the thread section 17. It is expedient in any case for the external thread 20 to extend axially to directly up to the head section 18 and therefore ends only at the annular grading 29.

The external thread 20 can be any thread type. It is preferably a metric thread, an inch thread is, however, also possible.

The external thread 20 is expediently composed in a manner known per se of a furrow 20a extending helically around the longitudinal axis 16 and a protrusion 20b flanking this helical furrow 20a axially on both sides and also extending helically around the longitudinal axis 16. It would, however, also be readily conceivable to segment the external thread 20 in the coil longitudinal direction.

The fastening opening 3 is provided on its inner circumferential surface with an internal thread 21 adapted to the external thread 20 of the fastening body 12 and in this respect formed in particular complementarily. The fastening opening 3 can therefore also be designated as a thread opening or thread bore.

Figure 5:
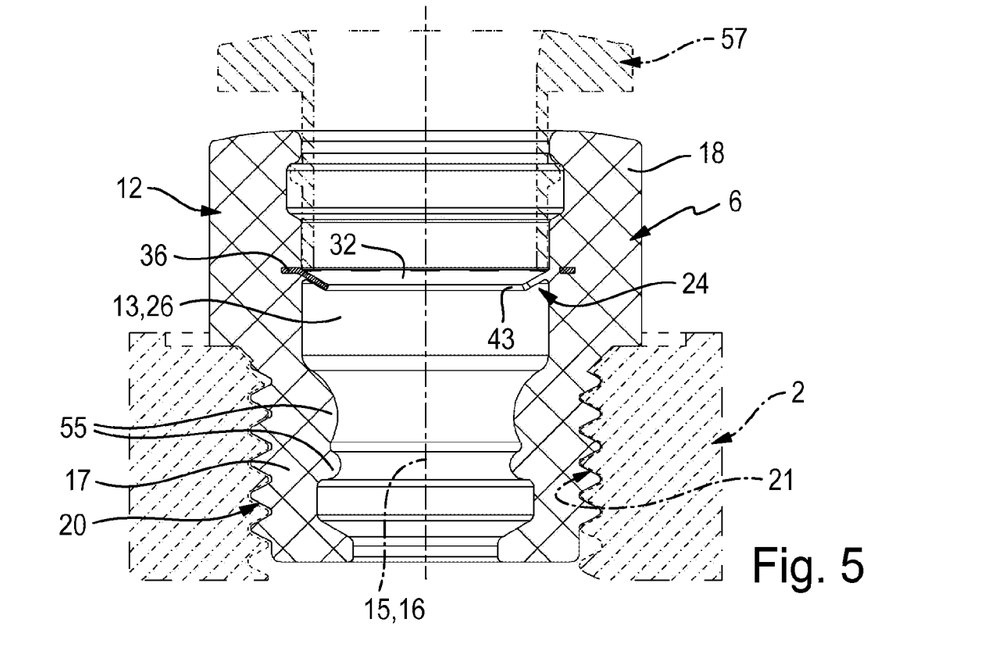

The connecting unit 4 dips into the fastening opening 3 with the thread section 17 in front in its position of use discernible from FIGS. 1 and 5, its external thread 20 engaging with the internal thread 21. In this case, the fastening body 12 is screwed with the carrier component 2 such that it abuts with its annular support surface 29a with pretensioning on the connection outer surface 7 acting as a counter support surface. The torque required for pretensioning can be introduced into the fastening body 12 via the head section 18.

In the case of the exemplary embodiment, the head section 18 is provided with a cylindrical outer contour such that it can be very easily gripped with the fingers of the hand to tighten. The head section 18 does not have an external thread and is in particular formed smooth which counteracts deposition of dirt. However, it would certainly be possible to provide the peripheral shell surface of the head section 18 with a plurality of flattened portions which particularly favour the introduction of a torque and which in particular provide the possibility of placing a suitably designed assembly tool for screws and nuts.

The fastening body 12 is formed integrally in one single piece and, including its external thread 20, consists of material with rubber-elastic properties. It preferably consists of an elastomer material and in particular of a thermoplastic elastomer material. The fastening body 12 is in particular manufactured by injection moulding from an injection-mouldable plastic material.

The rubber elasticity of the fastening body 12 is preferably selected such that it can be axially pressed into the fastening opening 3 provided with the internal thread 21 under elastic deformation of the external thread 20 without a screwing operation. In the case of this axial pressing into the fastening opening 3, consecutive locking or snap-in operations take place, in the case of which the protrusions 20b of the external thread 20 lock or snap one after the other into the consecutive winding sections of the internal thread 21. The mounting of the connecting unit 4 on the carrier component 2 can therefore take place saving significant time. Only when the fastening body 12 is inserted far enough into the fastening opening 3 that it abuts with its support surface 29a on the counter support surface of the carrier component 2 formed for example by the connection outer surface 7, is the fastening body 12 twisted further by introducing a torque into the head section 18 until the fastening body 12 is axially pretensioned with the carrier component 2 by a sufficient degree. In the case of this axial pretensioning, the support surface 29a is pretensioned with the counter support surface.

Owing to the rubber elasticity of the fastening body 12, the fastening body 12 can also be tightened sufficiently in a purely manual manner.

Irrespective of this advantageous mounting option, the fastening body 12 can of course also be fixed conventionally in the fastening opening 3 such that it is screwed into the internal thread 21 from the start with its external thread 20.

If the connecting unit 4 is supposed to once again be separated from the carrier component 2 at a certain time, this can easily take place as a result of the fastening body 12 being unscrewed from the fastening opening 3 by introducing a correspondingly oriented torque into the head section 18. In the case of sufficient elasticity of the thread section 17 and in the case of corresponding large pulling force, there is also the option of unscrewing the fastening body 12 from the fastening opening 3 without a screwing operation, at least after the axial pretensioning has firstly been removed by slight twisting of the fastening body 12.

The annular retaining element 24 mentioned further above is fixed on the fastening body 12 in relation to the through opening 13 of coaxial alignment, in particular in an undetachable manner.

The annular retaining element 24 encloses a ring opening 32 which is aligned coaxially to the through opening 13 of the fastening body 12 and as a result also defines a longitudinal section of the insertion opening 26. The fluid line 5 inserted into the connecting unit 4 also penetrates the ring opening 32 of the retaining element 24.

The retaining element 24 is anchored exclusively in the head section 18 of the fastening body 12. It does not engage into the thread section 17. As a result, the thread section 17 can be designed for small diameters without any problems. The retaining element 24 expediently has smaller dimensions than the head section 18 in the axial direction and is arranged in the head section 18 such that it is axially towered over on both sides by longitudinal sections of the head section 18.

The annular retaining element 24 is located in its entirety outside of the fastening opening 3 in the mounted position of use of the connecting unit 4.

Figure 6:
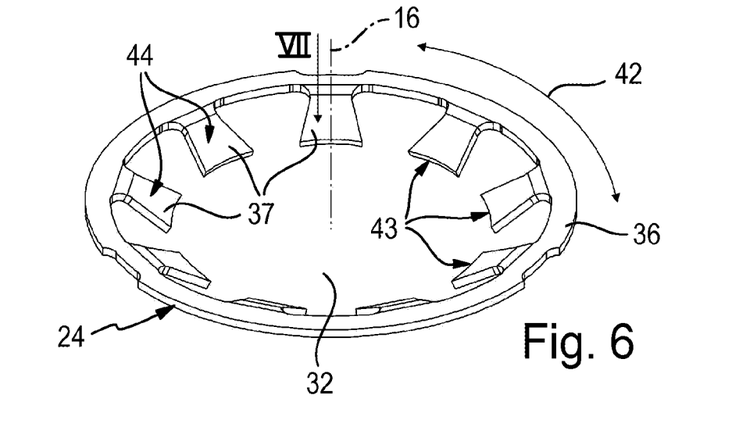
Figure 7:
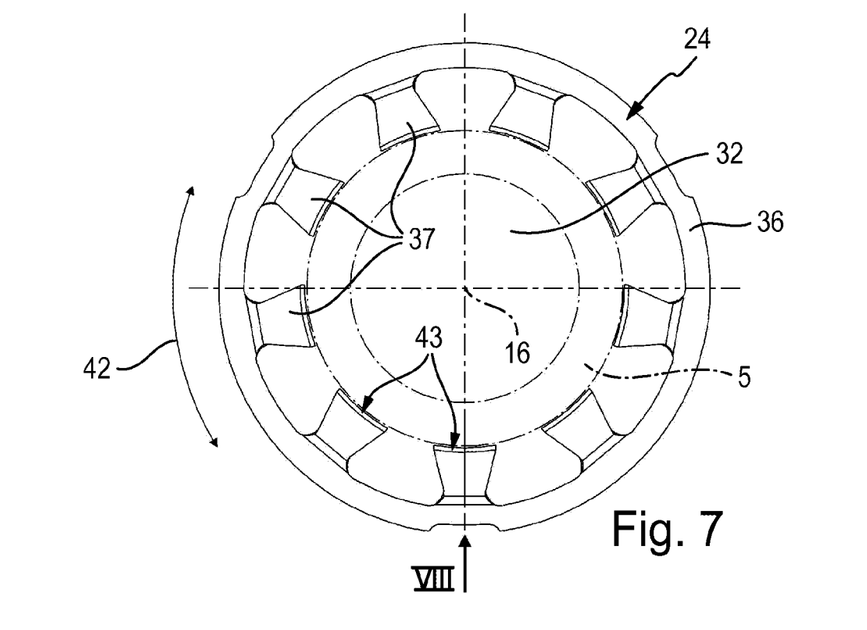
Figure 8:
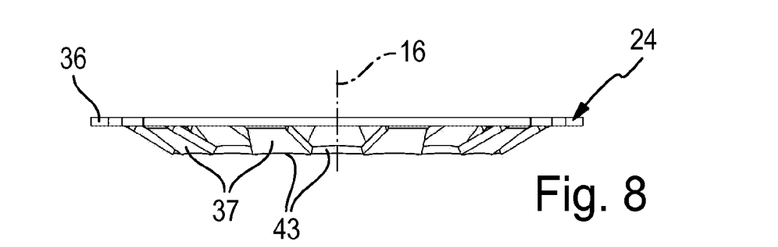

The retaining element 24 expediently has an annular section which is used for anchoring in the fastening body 12 and for this reason is designated as anchoring annular body 36. The anchoring annular body 36 has a circumferential direction which is made known in FIGS. 6 and 7 in the case of 42 by a double arrow and in the case of which it is the direction around the longitudinal axis 16 of the connecting unit 4.

The anchoring annular body 36 carries a plurality of retaining claws 37 which are arranged on the anchoring annular body 36 distributed along its circumferential direction 42. A space is expediently located between retaining claws 37 directly adjacent in the circumferential direction 42. The retaining claws 37 as a whole form a retaining claw rim extending around the longitudinal axis 16.

The retaining claws 37 expediently extend preceding from the anchoring annular body 36 obliquely radially inwardly and also axially in the direction to the front side 22. They consequently have an oblique rear surface 44 which is facing a rear side-outlet opening 13a of the through opening 13 of the fastening body 12. The anchoring annular body 36 is embedded into the head section 18 of the fastening body 12, both axial front surfaces and the radially outwardly located enveloping surfaces of the anchoring annular body 36 being covered by the material of the fastening body 12.

The inner diameter of the anchoring annular body 36 preferably corresponds to the inner diameter of the longitudinal section of the through opening 13 extending in the head section 18 such that only the retaining claws 37 protrude radially outwardly into the through opening 13 from the retaining element 24.

The retaining element 24 is expediently formed integrally as a single piece. Its anchoring annular body 36 is preferably unslotted and therefore closed around itself. The retaining element 24 expediently consists of a spring-elastic metal, in particular stainless steel. It can be manufactured cost-effectively as a stamped bent part.

The retaining collar 6 is in particular produced as a result of the rubber-elastic fastening body 12 being manufactured by injection moulding and being formed on the retaining element 24 directly during its injection moulding manufacture. As a result, there is in particular a positive-locking connection between the rubber-elastic material of the fastening body 12 and the surface sections of the retaining element 24 covered by the material of the fastening body.

In the case of the exemplary embodiment not shown, the annular retaining element 24 is snapped into a retaining depression of the previously separately produced fastening body 12 formed on the inner circumference of the head section 18.

Figure 3:
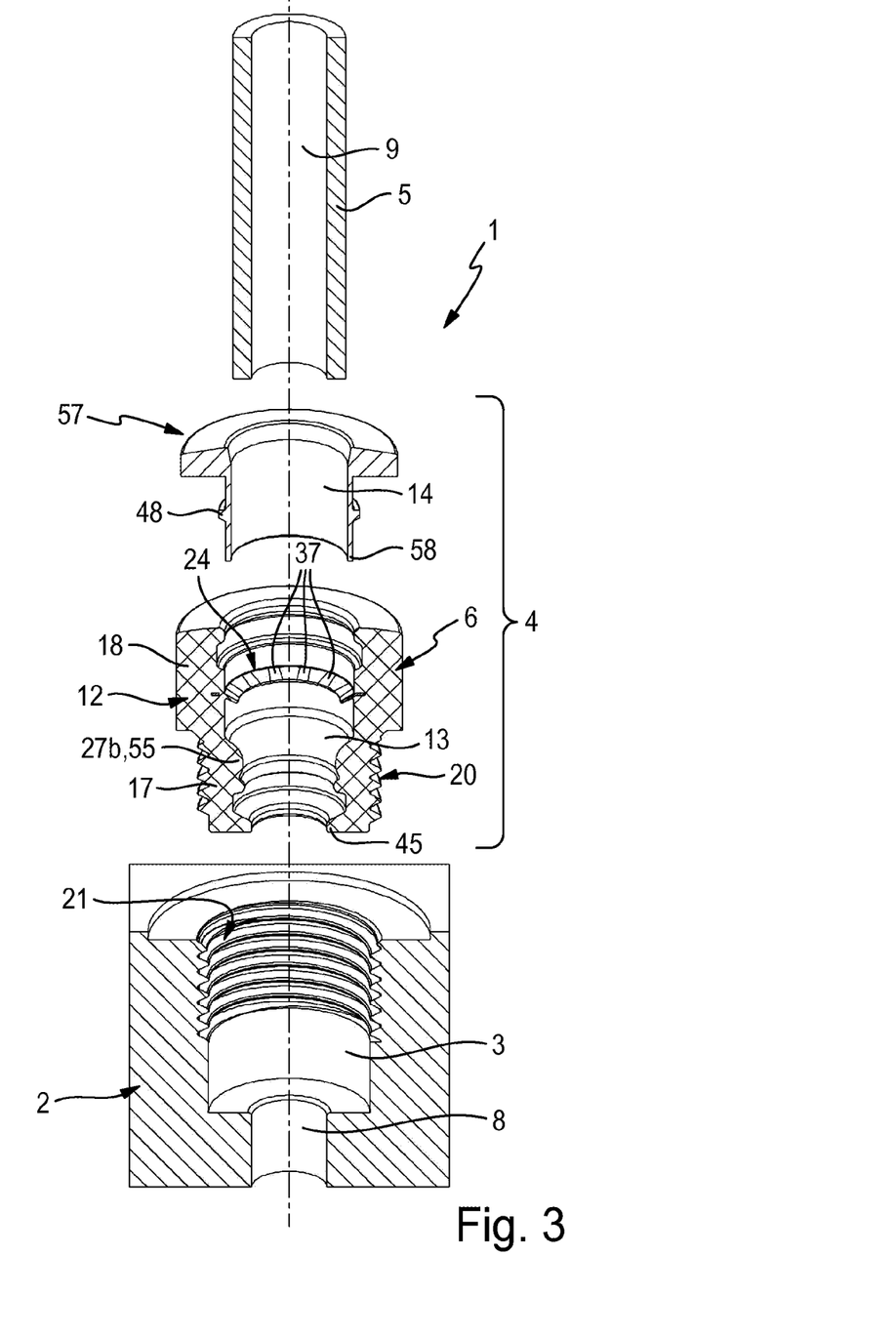
Figure 4:
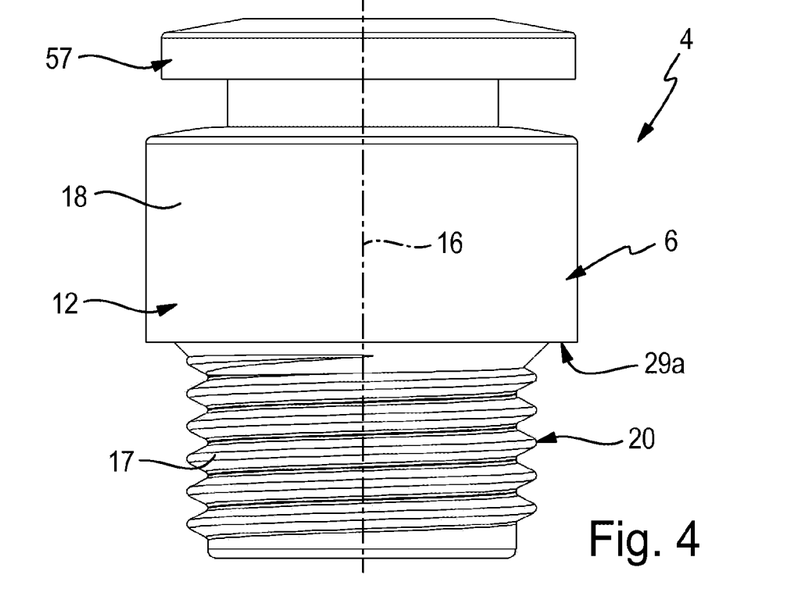

The intermediate spaces located between retaining claws 37 adjacent to one another in the circumferential direction 42 can be empty. However, they can also be filled by the rubber-elastic material used to implement the fastening body 12, as it is conveyed in FIG. 3. Owing to the rubber elasticity of this material, the mobility of the retaining claws 37 is not impaired as a result.

The retaining claws 37 expediently have a retaining edge 43 opposed to the anchoring annular body 36. In the undeformed, tension-neutral state of the retaining claws 37, all the retaining edges 43 are located on one diameter which is smaller than the outer diameter of the fluid line 5 to be fixed. In order to connect a fluid line 5, the same is inserted with a line end from the rear side 23 into the insertion opening 26 and also inserted through the annular opening 32 of the annular retaining element 24. Upon insertion, the fluid line 5 impinges with its leading front surface on the oblique rear surfaces 44 of the retaining claws 37, which are therefore pivoted or deformed radially outwardly with the build-up of a spring return force such that they abut with their retaining edges 43 under pretension on the outer circumferential surface 28 of the fluid line 5 and can even be pressed or embedded into the outer circumferential surface 28 depending on the material of the fluid line 5. There is also the option of providing a retaining groove on the outer circumference of the fluid line 5 into which the retaining claws 37 can snapped in with their retaining edges 43.

In the case of the illustrated preferred exemplary embodiment, the rubber-elastic fastening body 12 also forms a sealing structure 27, which, in the position of use of the connecting unit 4, cooperates in a sealing manner in sections with the carrier component 2 and similarly in sections with the outer circumferential surface 28 of the inserted fluid line 5. In this manner, an uncontrolled fluid leak from the fastening opening 3 to the environment can be effectively avoided without having to resort to special sealing elements.

In the case of the preferred exemplary embodiment, the sealing of the retaining collar 6 in relation to the carrier component 2 and the inserted fluid line 5 is carried out exclusively by the fastening body 12 with its rubber-elastic material with good sealing properties. For this reason, the connecting device 1 is not equipped with one or a plurality of additional rubber-elastic sealing elements.

The fastening body 12 or the sealing structure 27 defined by the fastening body 12 preferably has at least one annular outer sealing section 27a cooperating in a sealing manner with the carrier component 2 and at least one inner sealing section 27b cooperating in a sealing manner with the inserted fluid line 5.

The outer sealing section 27a is preferably formed directly by the external thread 20 of the thread section 17. A reliable sealing is achieved by the thread engagement between the rubber-elastic external thread 20 and the rigid internal thread 21 of the carrier component 2 which prevents fluid passing between the carrier component 2 and the fastening body 12.

Additional particular measures expediently ensure that the external thread 20 is pressed at least partially actively radially outwardly and as a result is radially pretensioned with the internal thread 21 of the fastening opening 3. This increases, on the one hand, the tightness and ensures, on the other hand, a friction closure between the two threads 20, 21 which counteracts an unintended release of the screw connection between the fastening body 12 and the carrier component 2.

The particular measures consist of the thread section 17 of the fastening body 12 having, on its inner circumference radially bordering the through opening 13, at least one annular sealing bead 55 arranged concentrically and protruding radially inwardly. This sealing bead 55 is an integral part of the fastening body 12. It protrudes radially inwardly in relation to axially adjacent regions of the fastening body 12 and defines an inner diameter in the tension-neutral state which is smaller than the outer diameter of the fluid line 5 to be connected. The sealing bead 55 is radially deformed by the inserted fluid line 5 and expanded in its inner diameter such that it abuts on the outer circumferential surface 28 of the fluid line 5 under pretensioning and with optimal sealing owing to the building elastic return force.

The radial deformation of the at least one sealing bead 55 also, however, leads to at least the longitudinal section of the thread section 17 having the sealing bead 55 and of the longitudinal section of the external thread 20 located thereon being elastically pressed radially outwardly which results in the already mentioned radial pretensioning between the external thread 20 and the internal thread 21.

The fastening body 12 therefore undergoes reinforcement of its fastening force in the fastening opening 3 directly by way of the inserted fluid line 5.

If the fluid line 5 is subsequently removed again from the connecting unit 4, the fastening forces associated with the inserted fluid line 5 are also again reduced such that the retaining collar 6 can be relatively easily unscrewed or even pulled out of the fastening opening 3 if required.

The at least one annular sealing bead 55 therefore expediently forms the above-mentioned inner sealing section 27b.

The at least one sealing bead 55 is preferably placed such that it has a distance both to the head section 18 and to the front surface of the fastening body 12 located on the front side 22.

The thread section 17 also still preferably contains an annular stop collar 45 protruding radially inwardly which is an integral part of the thread section 17 and accordingly also consists of a material with rubber-elastic properties. When the sealing bead 55 is present, this stop collar 45 is located closer to the front side 22 of the connecting unit 4 than this at least one sealing bead 55.

The annular stop collar 45 delimits a free cross-section, whose diameter is smaller than the outer diameter of the fluid line 5 to be connected and which is preferably so small that the fluid line 5 can then also not be inserted through it when it is pressed into the connecting unit 4 with relatively strong force. The stop collar 45 therefore defines the maximum insert depth of the fluid line 5. The free cross-section framed by the stop collar 45 is expediently smaller than that framed by the at least one sealing bead 55. The free cross-section framed by the stop collar 45 preferably at least substantially corresponds to the cross-section of the line channel 9.

The stop collar 45 is expediently formed directly on the front side 22 of the thread section 17.

If an inserted fluid line 5 is supposed to be able to be removed easily once again, there is the option of equipping the connecting device 1 with the release sleeve 57 already mentioned above.

The release sleeve 57 extends coaxially in the fastening body 12 into whose through opening 13 it dips coaxially from the rear side 23. A front end section 58 of the release sleeve 57 ends axially with respect to the rear surfaces 44 of the retaining claws 37, while a rear side-actuation section 59 of the release sleeve 57 protrudes axially from the retaining collar 6 in the region of the rear side 23. In the case of the connection operation, the fluid line 5 is also inserted through the release sleeve 57. To release the fluid line 5, a pressing force directed forwards can be exerted on the actuation section 59 of the release sleeve 57 such that the release sleeve 57 is pushed in the direction of the retaining element 24 and presses on the rear surfaces 44 of the retaining claws 37 with its front end section 58. The retaining claws 37 are as a result bent radially outwardly under elastic deformation and lifted from the outer circumferential surface 28 of the inserted fluid line 5 which can then be comfortably removed once again.

In the case of the exemplary embodiment, the release sleeve 57 is fixed in a particularly simple manner on the retaining collar 6. The fastening body 12 has an annular groove-like extension designated as securing groove 47 in the head section 18 inside the longitudinal section of the through opening 13 extending therein. The release sleeve 57 has at least one securing projection 48 protruding radially outwardly on its longitudinal section protruding into the through opening 13 which is preferably annular and whose axial length is shorter than that of the securing groove 47.

The securing groove 47 is expediently located in the longitudinal section of the through opening 13 extending between the retaining element 24 and the rear side-outlet opening 13a.

The securing projection 48 engages into the securing groove 47 radially inwardly, the mentioned opposing longitudinal dimension ensuring the axial relative movement between the release sleeve 57 and the retaining collar 6 required for the release operation. The securing projection 48 also ensures, by way of the engagement into the securing groove 47 that the release sleeve 57 is permanently held on the fastening body 12 and cannot fall out of the through opening 13.

The mounting of the release sleeve 57 in the retaining collar 6 has been proven to be particularly simple owing to the rubber elasticity of the head section 18. As part of an easy locking operation, the release sleeve 57 can be pressed into the through opening 13 axially from the rear side 23, the material of the head section 18 being elastically deformed by the securing projection 48 until it ultimately snaps into the securing groove 47. With an inverse motion sequence, the release sleeve 57 can in this manner also be very easily removed from the retaining collar 6 at any time. The user of the connecting device 1 therefore has the advantageous option of equipping the retaining collar 6 with a release sleeve 57 if required without using a tool.

The invention claimed is:

1. A connecting device for a fluid line, having a connecting unit which is axially penetrated by an insertion opening into which a fluid line to be connected is insertable from a rear side, wherein the connecting unit has an integral fastening body made in one single piece which has a thread section provided with an external thread and a head section adjoining thereto on the rear side and which carries an annular retaining element arranged coaxially to the insertion opening which has a plurality of retaining claws protruding into the insertion opening which are designed to impinge upon the outer circumference of the fluid line inserted into the insertion opening for the purposes of holding it, wherein the connecting unit is insertable with its thread section into a fastening opening of a separate carrier component having an internal thread and is fixable on the carrier component by engagement into the internal thread of this fastening opening to adopt a position of use, wherein, including its external thread, the integral fastening body comprises a material with rubber-elastic properties and the annular retaining element is anchored exclusively in the head section of the fastening body without engagement into the thread section, and wherein the fastening body has, in the region of the thread section, at least one annular sealing bead arranged concentrically in relation to the insertion opening and protruding radially inwardly into the insertion opening, said sealing bead is provided for tight contact on the outer circumferential surface of the inserted fluid line and which can be pressed radially outwardly through the inserted fluid line such that the external thread of the thread section is also at least partially radially outwardly deformable in order to be pretensioned with the internal thread of the carrier component with a sealing effect in the position of use of the connecting unit.

2. The connecting device according to claim 1, wherein the head section has a larger outer diameter than the thread section and adjoins the thread section via an annular grading.

3. The connecting device according to claim 2, wherein the annular grading defines a support surface pointing axially forwards in the direction of the thread section which is designed in the position of use of the connecting unit for support on a counter support surface framing the outlet of the fastening opening of the carrier component.

4. The connecting device according to claim 1, wherein the head section is formed without an external thread.

5. The connecting device according to claim 1, wherein the external thread of the thread section extends axially to directly up to the head section.

6. The connecting device according to claim 1, wherein, as a whole, the retaining element has smaller axial dimensions than the head section of the fastening body and is fixed in the head section at an axial distance from the thread section such that it is axially towered over on both sides by the head section.

7. The connecting device according to claim 1, wherein the retaining element has an anchoring annular body by means of which it is embedded into the fastening body coaxially to the insertion opening and on which the retaining claws are integrally arranged.

8. The connecting device according to claim 7, wherein the retaining claws are protruding obliquely radially inwardly.

9. The connecting device according to claim 1, wherein the retaining element as a whole is formed integrally in one piece.

10. The connecting device according to claim 9, wherein the retaining element consists of spring-elastic material.

11. The connecting device according to claim 10, wherein the retaining element is produced as a stamped bent part.

12. The connecting device according to claim 1, wherein the rubber-elastic fastening body is formed on the retaining element directly during its manufacture by injection moulding.

13. The connecting device according to claim 1, wherein the rubber-elastic fastening body comprises an elastomer material.

14. The connecting device according to claim 13, wherein the rubber-elastic fastening body consists of a thermoplastic elastomer material.

15. The connecting device according to claim 1, wherein the rubber-elastic fastening body forms a sealing structure which has at least one outer sealing section provided to abut on the carrier component in a sealing manner in the position of use and at least one inner sealing section enclosing the inserted fluid line at its outer circumferential surface in a sealing manner.

16. The connecting device according to claim 1, wherein the fastening body is elastically deformable such that it can be axially pressed with its thread section into the internal thread of the fastening opening of the carrier component under elastic deformation of the external thread to fix the connecting unit in the position of use without a screwing operation.

17. The connecting device according to claim 1, wherein a release sleeve serving the releasing actuation of the retaining claws is displaceably mounted in the fastening body which protrudes from the fastening body on the rear side with an actuation section.

18. The connecting device according to claim 17, wherein the release sleeve is locked into a securing groove formed in the head section.

19. The connecting device according to claim 1, wherein the carrier component belongs to the connecting device.

20. The connecting device according to claim 19, wherein the carrier component is a housing body in which a fluid channel communicating with the fastening opening is formed.

21. The connecting device according to claim 1, wherein the head section has a cylindrical outer contour.

22. A connecting device for a fluid line, having a connecting unit which is axially penetrated by an insertion opening into which a fluid line to be connected is insertable from a rear side, wherein the connecting unit has an integral fastening body made in one single piece which has a thread section provided with an external thread and a head section adjoining the thread section on the rear side, the head section carrying an annular retaining element arranged coaxially to the insertion opening which has a plurality of retaining claws protruding into the insertion opening of the head section for impinging upon the outer circumference of the fluid line inserted into the insertion opening for the purposes of holding it, wherein the connecting unit is insertable with its thread section into a fastening opening of a separate carrier component having an internal thread and is fixable on the carrier component by engagement into the internal thread of this fastening opening to adopt a position of use, wherein, including its external thread, the integral fastening body comprises a material with rubber-elastic properties and the annular retaining element is anchored exclusively in the head section of the fastening body without engagement into the thread section, and wherein the thread section of the fastening body has at least one annular sealing bead arranged concentrically in relation to the insertion opening and protruding radially inwardly into the insertion opening of the thread section, said sealing bead being provided for tight contact on the outer circumferential surface of the inserted fluid line and which can be pressed radially outwardly through the inserted fluid line such that the external thread of the thread section is also at least partially radially outwardly deformable in order to be pretensioned with the internal thread of the carrier component with a sealing effect in the position of use of the connecting unit.

* * * * *